United States Patent [19]

Boue

[11] Patent Number: 4,628,352
[45] Date of Patent: Dec. 9, 1986

[54] DEVICE FOR CORRECTING VIDEO SIGNALS IN A SYSTEM FOR ACQUISTION AND SCANNING OF FAST SIGNALS INVOLVING THE USE OF A STREAK CAMERA

[75] Inventor: Philippe Boue, Villennes sur Seine, France

[73] Assignee: Thomson CSF, Paris, France

[21] Appl. No.: 767,772

[22] Filed: Aug. 16, 1985

[30] Foreign Application Priority Data

Aug. 21, 1984 [FR] France ................. 84 13018

[51] Int. Cl.⁴ .................. H04N 3/15; H04N 5/335; H04N 7/18
[52] U.S. Cl. ......................... 358/93; 358/213
[58] Field of Search ............ 358/93, 209, 213, 111

[56] References Cited

U.S. PATENT DOCUMENTS

| | | | |
|---|---|---|---|
| 3,729,585 | 4/1973 | Davidson et al. | 358/93 |
| 3,949,162 | 4/1976 | Malueg | 358/213 X |
| 4,120,002 | 10/1978 | Lieber | 358/209 X |
| 4,232,333 | 11/1980 | Hiruma et al. | 358/93 |
| 4,253,120 | 2/1981 | Levine | 358/213 |
| 4,298,887 | 11/1981 | Rode | 358/213 |
| 4,435,727 | 3/1984 | Schiller et al. | 358/93 |
| 4,523,231 | 6/1985 | Therrien | 358/213 X |
| 4,555,731 | 11/1985 | Zinchuk | 358/213 X |
| 4,581,648 | 4/1986 | Ganther | 358/209 X |

FOREIGN PATENT DOCUMENTS 2141004A 12/1984 United Kingdom ............... 358/93

Primary Examiner—William B. Perkey
Attorney, Agent, or Firm—Cushman, Darby & Cushman

[57] ABSTRACT

A device for correcting video signals in order to perform fine scanning of fast signals with a streak camera is completed by a system for correcting nonuniformity of black, nonuniformity of response of the sensing matrix and local defects of the matrix. The corresponding data are stored respectively in three memories. An image memory receives the corresponding corrected signal. Complementary means are provided for correcting nonlinearity of response of the complete chain and geometrical defects of spatial and temporal nonlinearities of the chain elements upstream of the matrix, the corresponding data being stored in two other memories.

8 Claims, 11 Drawing Figures

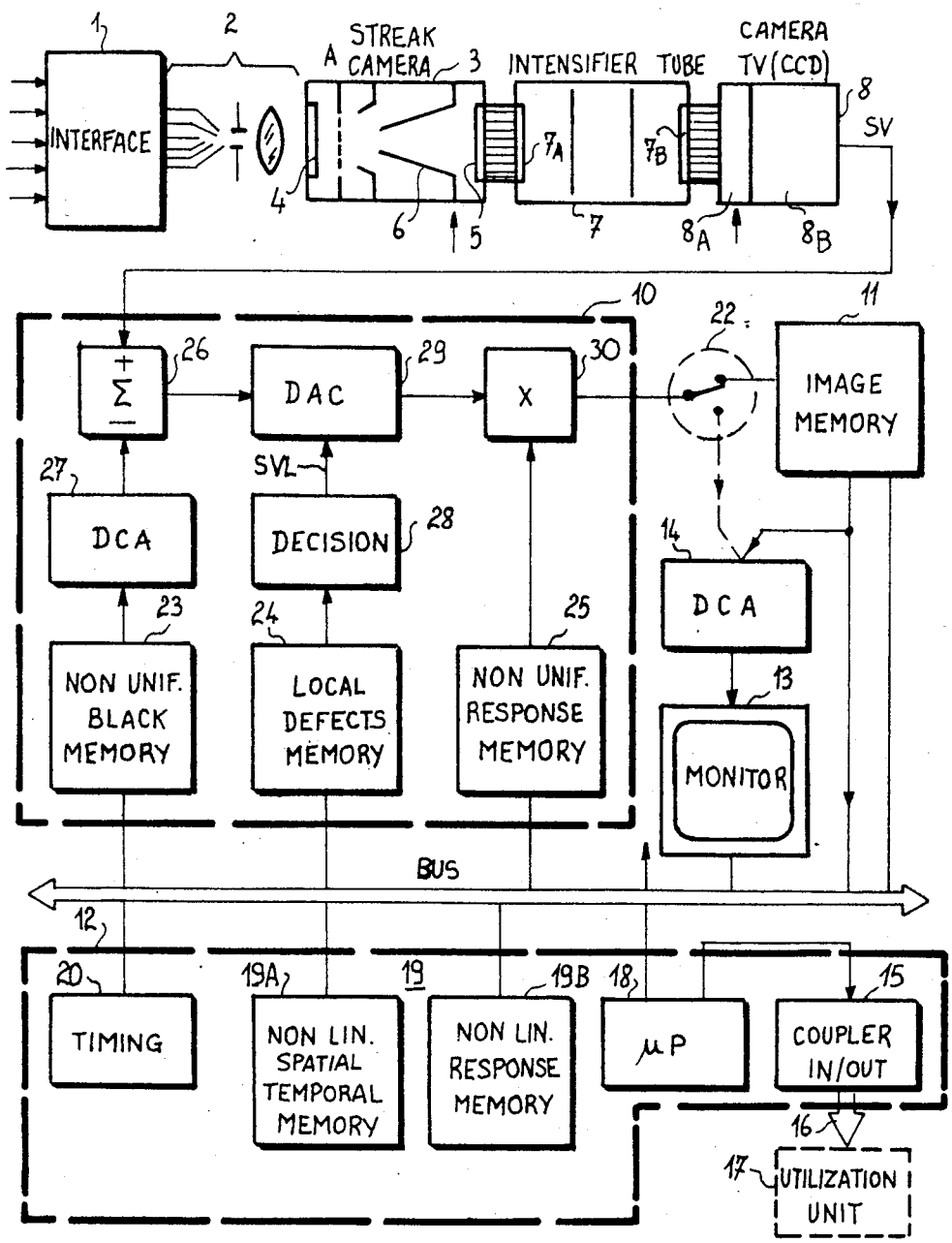
FIG_1

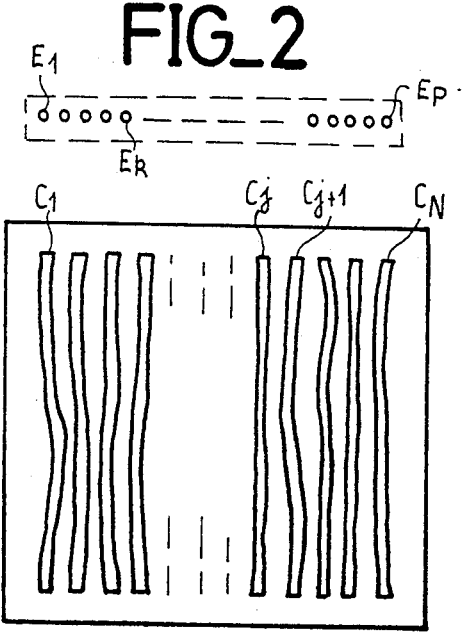
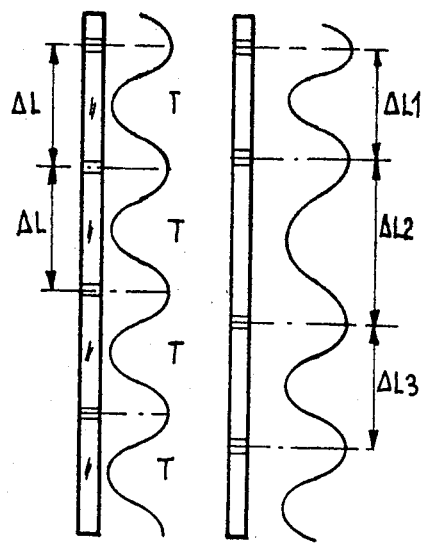
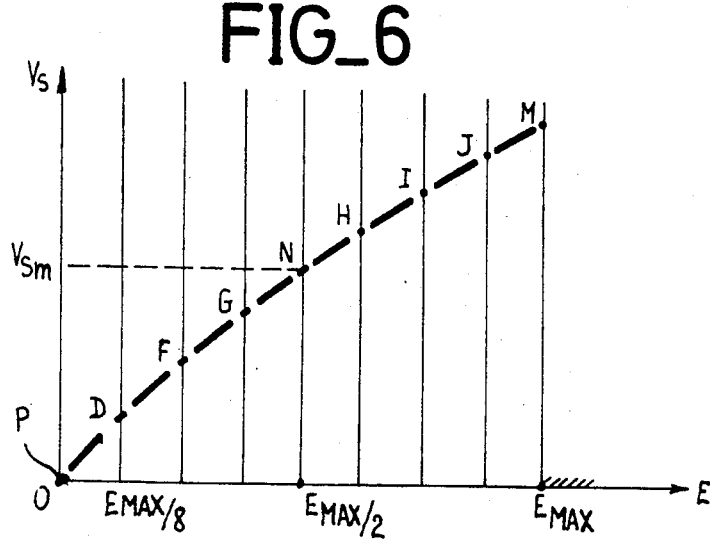

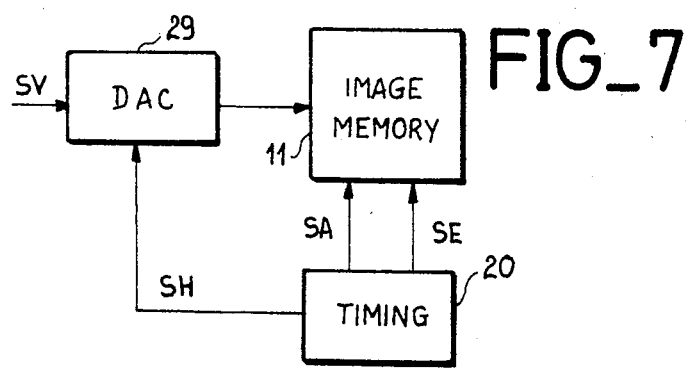
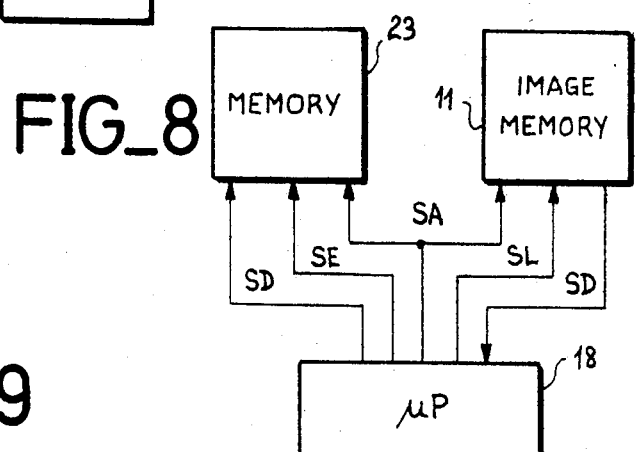
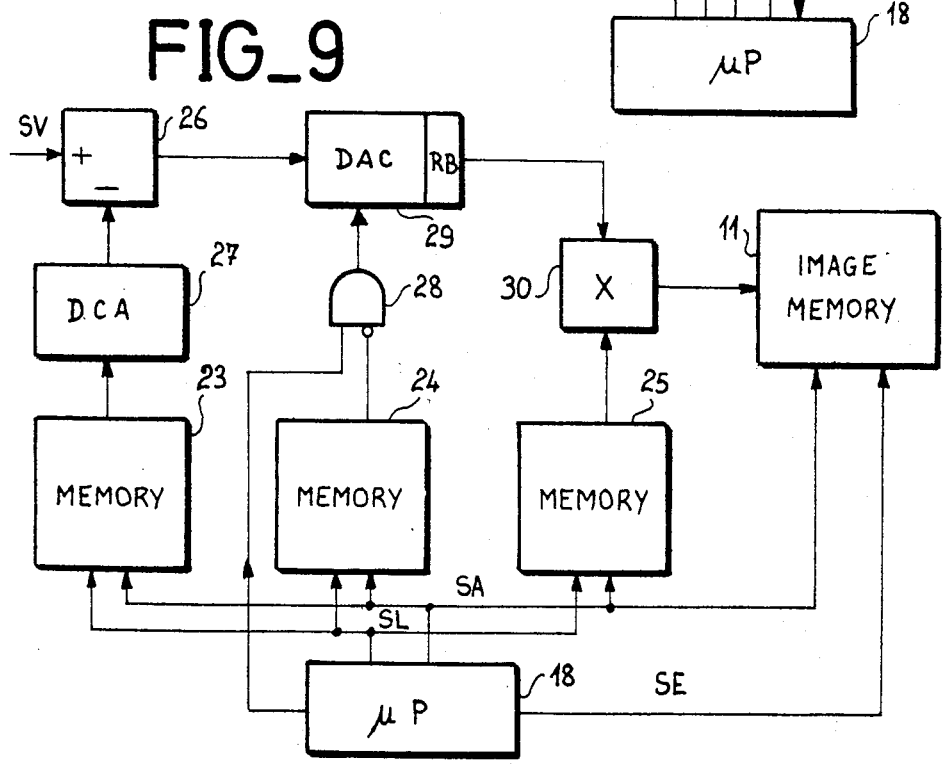

FIG_10
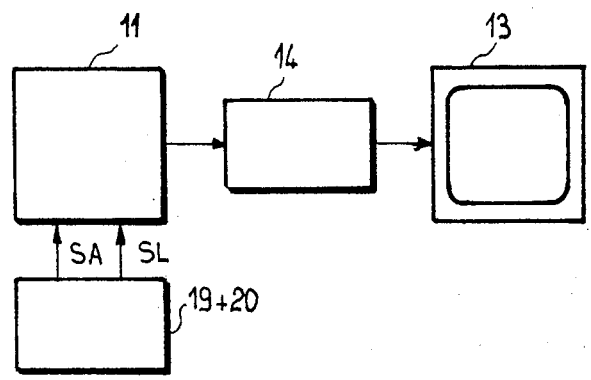
FIG_11
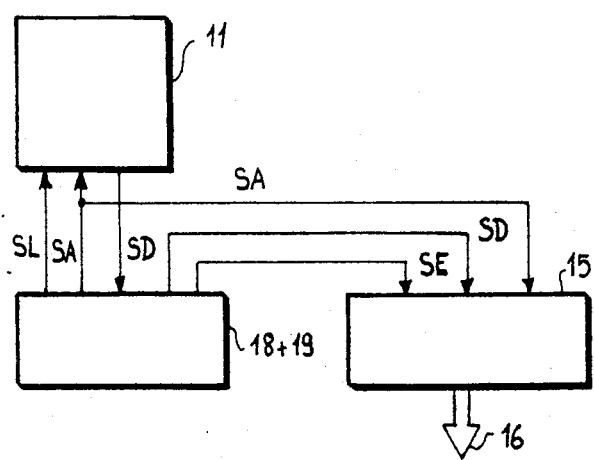

DEVICE FOR CORRECTING VIDEO SIGNALS IN A SYSTEM FOR ACQUISTION AND SCANNING OF FAST SIGNALS INVOLVING THE USE OF A STREAK CAMERA

BACKGROUND OF THE INVENTION

1. Field of the Invention

The present invention relates to a device for correcting video signals delivered by the sensor of a television camera and, more particularly, in systems in which the television camera itself is preceded by a streak camera, such as multichannel systems for acquisition and scanning of fast signals.

2. Description of the Prior Art

As disclosed in French Pat. No. 2,525,844, a device for correcting signals delivered by the sensor of a television camera is already known. This device is more particularly intended for a television camera constituted by a solid-state matrix of the type comprising a charge-coupled device (CCD). This device suffers from disadvantages arising from the fact that the different elements of the sensing mosaic each corresponding to one image resolution point do not behave in a strictly identical manner and exhibit slight differences from one element to another. In consequence, the correcting device is designed to correct the different defects which arise in this type of sensor.

In the first place, it is necessary to provide correction for nonuniformity of black response, that is to say with zero illumination. To this end, the objective is shut off and the corresponding detected video signals S1 are recorded, converted to digital form and stored in a first memory. At the time of utilization, the black error signal stored in the memory will be subtracted from the video value detected in respect of the corresponding point in order to eliminate this error in nonuniformity of black response. The stored signal is re-converted to analog form before being applied to the subtracting device constituted by a differential amplifier or the like. The corresponding circuits therefore comprise an analog-to-digital conversion circuit which receives the signals from the sensor, a first image memory for storing the values detected point by point under conditions of zero illumination, a digital-to-analog conversion circuit, and an analog subtraction circuit.

A second defect which is removed by the correcting device is nonuniformity of response of the elements. This nonuniformity of response is taken into consideration for a predetermined uniform illumination which is the value of mean illumination in the range of illumination contemplated. The television camera is therefore placed under conditions of recording of a scene having mean uniform illumination, the detected values are recorded as before, and a coefficient of proportionality is calculated in order to achieve compensation and to ensure a uniform response of the different matrix elements. In the patent specification cited earlier, the coefficient of proportionality is of the form $1/B = K/S2 - S1$, where K is a predetermined constant which is identical for all the elements of the sensor, S1 designates the black signals and S2 designates the signals corresponding to uniform mean illumination. The correcting device comprises digital computing means which are coupled to the output of the analog-to-digital conversion circuit in order to generate the signal 1/B. These digital values of correction are stored in a second memory. At the time of utilization, the stored values 1/B are converted to analog form in the digital-to-analog converter in the same manner as before and applied to an analog multiplier in order to make the corresponding point-by-point correction of the detected video signals.

A third defect corrected by the correcting device is that of local faults. This defect is defined by the fact that the video response of the sensing element must remain within a given range for a given level of illumination such as the mean value of illumination. And if said video response is located below a minimum value or above a maximum value, these two values being set as limits for the range aforesaid, it will be considered that the corresponding element must not be taken into account. This defect is taken into consideration in the device comprising the aforementioned digital computation means which serve to check whether the coefficient 1/B is comprised between a maximum value M and a minimum value L. If these conditions are not satisfied by the photosensitive element which is taken into account, this element is considered as faulty and the corresponding fault information which may result is employed as a validation signal for the purpose of taking into account or not taking into account the video signal of the current node at the output of the multiplier. In the case of a faulty element, a delay circuit in which the displacement in time corresponds to that of two successive points of the same line in the scanning raster makes it possible to take into account the value of the signal corresponding to the previous point in order to remove the local fault detected.

In the case of the application to a system for acquisition with a streak camera, other defects appear and have to be taken into account if it is desired to make an accurate and reliable scan of fast incident signals. The time-duration of these signals can in fact be extremely short, for example within the range of a few tens of picoseconds to a few nanoseconds. These complementary defects are those of nonlinearity of response of the matrix elements in respect of one and the same signal applied to the input and involve the entire receiving chain, and geometrical defects of spatial and temporal nonlinearity caused by those elements of the chain which are located upstream of the television camera.

A distinction has to be drawn between the nonlinearity defects which are to be considered over the entire operating range in order to cover the full dynamic range of the system and the aforementioned nonuniformity defects which have been considered for uniform lighting of mean value. It should be noted that, for a conventional television image display, the video correction for nonuniformity is sufficient since the nonlinearity defect is not usually perceptible to the viewer's eye.

The aim of this invention is to provide a remedy for the aforementioned complementary defects as well as the defects attached to recording in a television scan on a camera of the solid-state circuit type, this being achieved by making provision for the correcting device.

SUMMARY OF THE INVENTION

In accordance with the invention as defined in the appended claims, it is proposed to provide a system for acquisition and scanning of fast signals, which makes use of a streak camera upstream of a solid-state television camera and is equipped with a device for correcting the detected video signal in order to correct the defects of nonuniformity of black, local defects and defects of nonuniformity of response. The distinctive feature of said system lies in the fact that the output of the subtracting circuit in which the correction is made for nonuniformity of black is connected to the multiplying circuit in which the correction for nonuniformity of response is carried out through an analog-to-digital converter which receives a signal for validation of local defects. The correction for nonuniformity of response takes place in digital form in said multiplying circuit which delivers the corrected video signal via a digital output to an image memory in which it is stored. In accordance with another distinctive feature of the system, means for management, computation and storage in memory make it possible to produce and store data for the correction of complementary defects represented by the defects of nonlinearity of response of the chain in respect of the different sensing elements and by geometrical defects of spatial and temporal nonlinearities caused by the elements upstream of the television camera.

BRIEF DESCRIPTION OF THE DRAWINGS

Other features of the invention will be more apparent upon consideration of the following description and accompanying drawings, wherein:

FIG. 1 is a general block diagram of a system for acquisition and scanning of fast signals equipped with a correcting device in accordance with the present invention;

FIGS. 2 and 3 are diagrams illustrating defects of spatial nonlinearity;

FIGS. 4 and 5 are diagrams illustrating defects of temporal nonlinearity;

FIG. 6 is a curve illustrating the defects of nonlinearity of response;

FIGS. 7 and 8 illustrate the procedure involved in acquisition of defect data and storage of said data;

FIG. 9 is a diagram of the correcting circuits during the utilization stage;

FIG. 10 is a diagram relating to utilization in a cathode-ray tube (CRT) display;

FIG. 11 is a diagram relating to utilization with remote data transmission.

DESCRIPTION OF THE PREFERRED EMBODIMENTS

The block diagram of FIG. 1 represents the general structure of the system. The phenomenon to be observed, whether it is of electrical or optical nature, is applied to an input interface circuit 1. Said interface generates calibrated optical signals. Said optical signals are transmitted to a streak camera via an optical fiber-transmission assembly and an optical matching device. The intermediate optical assembly between the interface and said camera is designated by the reference numeral 2 and can consist of a bundle of optical fibers terminating at one end in a light-emitting slit formed by linearly juxtaposed fibers. A lens can then be placed at its focal distance from the slit, behind a shield which is adapted to the configuration or else the light beam can reach the camera by means of an optical fiber stub. The solution to be adopted depends on the equipment already carried by the streak camera. A photocathode 4 is provided at the entrance of the streak camera 3 and an anode formed by a fluorescent screen 5 is provided at the exit of the camera. Grids and deflecting elements are provided between said photocathode and said anode. Consideration being given to a number N of channels each corresponding to one fiber of the light-emitting slit, provision is made at the entrance for N optical channels which are juxtaposed along a line and which, by virtue of the deflection, will be displaced vertically in order to display the time variation of the corresponding phenomenon in respect of each of said N channels. At the exit of the streak camera, the signal can be applied to a television camera if the gain is sufficient, as may be the case with a streak camera equipped with multichannels. Should this not be the case, an image intensifier tube 7 will be placed between the streak camera and the television camera in order to increase the light intensity of the signal. The fluorescent screen 5 is optically coupled to the input photocathode 7A of the intensifier tube, the coupling being usually assumed by a thick disk or so-called stub of optical fibers. Similarly, the output of the intensifier tube 7 comprises a fluorescent screen 7B which is also coupled to the television camera 8 by means of an optical fiber stub. It is considered that the television camera has a solid-state circuit structure comprising a charge-coupled device (CCD). The camera is in fact constituted by an X,Y matrix of photosensitive elements 8a for receiving the luminous flux from the stub which provides an optical coupling with the intensifier tube. Said matrix is in turn followed by preamplification and reading circuits 8b and these latter deliver the video signal SV which is similar to the signal of a line-by-line television scan.

The video signal just mentioned is transmitted to the processing circuits 10 in which it undergoes a certain number of corrections and from which it is delivered in corrected and digital form. The corrections carried out within the circuit are those indicated earlier and relating to the prior art, namely to the known technique which consists in correcting nonuniformity of black, eliminating elements which exhibit local defects and correcting nonuniformity of response of the matrix elements. The signal in digital form is then applied to an image memory 11 which can comprise a number of image planes for storing a predetermined but limited number of successive images.

The set of two cameras 3 and 8 as well as the processing circuits 10 and the image memory 11 are controlled by a management and computation unit 12. The stored image signals can be displayed on a monitor 13 after conversion to analog form in a converter 14 under the control of the unit 12. The image thus displayed comprises corrections which can be limited to those made in the processing circuit 10. In accordance with another mode of utilization, the signals are transmitted to the exterior via an input-output coupler 15 on a bus 16. Said signals are transmitted to an ancillary utilization unit 17 which can comprise a computer or complex recording circuits. For the purpose of this external utilization which usually relies on concepts other than the point density of the image, it is necessary to introduce other corrections resulting from the use of a streak camera. These corrections are produced by means of a computation unit 18 such as a microprocessor in order to be stored in random-access memories 19; they consist of spatial and temporal nonlinearity corrections which will be more clearly defined with reference to FIGS. 2 to 5. The unit 12 comprises in addition an interval-timing circuit 20. The switch 22 shown diagrammatically at the output of the circuit 10 relates to a direct utilization for displaying a scene without passing through the image memory whenever it is desired to display images at a high repetition rate of the television type.

In the processing circuits 10, there are shown three random-access memories in which the data corresponding to the corrections to be made have been stored, that is to say respectively nonuniformity of black in the memory 23, local defects in the memory 24 and nonuniformity of response in the memory 25. The memory 23 is connected to a substracting circuit 26 through a digital-to-analog conversion circuit 27 with a view to performing analog subtraction of the black correction from the incident video signal in respect of the point considered. The analog output of the subtracting circuit 26 is transformed by sampling and conversion to a digital signal in the circuit 29, on condition that a faulty photosensing element of the matrix 8A is not involved. In this case, the decision circuit 28 which delivers a validation signal SVL initiates sampling of the previous value. The following multiplying circuit 30 is a digital multiplying circuit which carries out the correction of nonuniformity of response. Multiplication in digital form makes it possible to increase the dynamic range and is easier to achieve.

Referring now to FIG. 2, there are shown in this figure a line of elements of the matrix composed of elements E1, E2 to $E_P$, the number P of elements of a line being greater than the number N of channels in order to ensure that each of the N light channels covers a plurality (at least two) of juxtaposed photosensitive elements and that a space is formed between two successive vertical recording traces $C_j, C_{j+1}$ of the time variations of the N light phenomena applied to the entrance of the streak camera 3. In FIG. 3, there is shown this vertical scan which results from the deflection applied to the electrode 6 of the streak camera in which the slit is considered as located in a horizontal direction. There are thus obtained N luminous traces C1 to CN as illustrated in FIG. 3 which shows with a certain degree of exaggeration that such traces are not strictly rectilinear. These defects of spatial nonlinearity are caused by various constructional defects of the streak camera 3 as well as defects in the other optical elements 2 and intensifier tubes 7 which are added to the chain.

FIGS. 4 and 5 are intended to provide a clear indication of the other defect concerned, namely temporal nonlinearity at the level of recording in the television camera 8. Accordingly, FIG. 4 shows the ideal response whereby each period T of a periodic signal such as the sine-wave signal shown by way of example will be translated vertically along successive elements having the same dimension $\Delta L$ on the photoreceiving target.

FIG. 5 shows the real case in which the response is not necessarily proportional to the time-duration T when taking account of irregularities in the scanning time and the like or of optical system deformations and the like. For example, the first sine-wave signal having a real time-duration T is recorded over a height $\Delta L1$ which is smaller than $\Delta L$ and the second sine-wave signal is recorded over a distance $\Delta L2$ which is longer than $\Delta L$, and so on in sequence.

These corrections of spatial and temporal nonlinearities are effectively performed by the management and computation unit 12 during a preliminary calibration stage. In a first step, uniform lighting is applied to the entrance of the slit and the microprocessor 18 serves to scan the data of luminous lines (traces C1 to CN) which are stored in the memory 11, thus making it possible to record their respective positions in the X,Y matrix of elements of the camera 8. These line-position data are stored in the form of a table in the RAM (random-access memory) 19A.

In order to make geometrical measurements which result from both spatial and temporal nonlinearities, a periodic signal such as a sine-wave signal, for example, is then transmitted to the N inputs and its deformation (as shown in FIG. 5) is scanned along each line $C_j$, the position of which is known by virtue of the above-mentioned data. The microprocessor 18 then computes a polynomial which corresponds to each line and which is stored at 19A. These spatial and temporal nonlinearity data are then applied to the data extracted from the image memory 11 when it is desired to transmit them to an external utilization unit 17 for an application other than simple visual display in order to make the corresponding spatial and temporal nonlinearity corrections.

FIG. 6 represents a curve of response of a sensing element of the matrix 8A after correction in the circuit 10 and storage in the image memory 11. The sensing element is considered to be nondefective. The black correction corresponds to the point P at which the corrected signal is zero in respect of zero illumination. The correction for nonuniformity of response corresponds in the case of the mean level of illumination E max/2 to a predetermined value $VS_m$ which is common to all the sensing elements. In fact, all the points of the curve are multiplied by the coefficient 1/B which is characteristic of the element considered in the multiplying circuit 30. All the curves therefore pass through the point P having a zero coordinate and through the point N having the coordinates $VS_m$ and E max/2. The other points shown, such as the points D, F, G, and so on, are not necessarily located on the straight line PN since the response is not necessarily strictly linear and the differences in nonlinearity are to be determined in order to make the appropriate corrections at the time of external fine analysis of the recording. In order to obtain the corresponding data, the curve PM of response of each element is plotted (in more precise terms, the mean value is established for all the elements involved in the response of each channel) and the microprocessor 18 stores a corresponding polynomial in another memory 19B. The operation is carried out as follows:

an illumination signal E having a predetermined value is applied to an input channel of the system and then successively to the other N−1 channels one after the other or else N signals equal to this value are applied simultaneously to the N channels;

this initial operation is repeated a certain number of times, the value of the signal being changed each time so as to cover the entire dynamic range of the system, namely its operating range from zero to E Max. By way of example, the operating range can be covered by considering a uniform distribution of L values with a difference E Max/L from one value to the next (it has been postulated in the figure that L=8);

in respect of each value of the illumination signal E, the image corresponding to the N channels is stored in the image memory 11;

in respect of each channel, the microprocessor 18 computes the mean value of response of the elements of the corresponding vertical line stored at 11 (this calculation advantageously makes use of the data relating to spatial positioning of the traces corresponding to the N lines C1 to CN shown in FIG. 3 and determined during the operation which consisted in computing spatial and temporal nonlinearities described earlier), there being thus obtained N mean values for the N channels in respect of each illumination value of the form E Max.k/L;

the mean values are then stored successively in the memory 19B after each of the L operations, the microprocessor 18 then computes for each channel a corresponding polynomial of the form $a_0+a_1x+a_2x^2+\ldots$ corresponding to its response curve and the N polynomials are stored in the memory 19B.

At the time of external utilization for fine analysis at 17, the microprocessor 18 computes the differences in nonlinearity to be applied. To this end, the detected value VS makes it possible by means of the polynomial to determine the correct value of illumination corresponding to each given channel and therefore to compute the deviation of this detected value VS with respect to the ideal linear response along the straight line PN.

FIG. 7 relates to the method of acquisition of the data to be stored in the memory 23, 24 or 25, the method adopted being the same. The video signal SV read from the sensing matrix 8a is applied to the converter 29 and stored in the image memory 11. During this operation, the interval-timing circuit 20 delivers a timing clock pulse SH to the analog-to-digital converter 29 and delivers addressing data SA and writing control data SE to the image memory 11.

FIG. 8 shows the transfer of corresponding data into the corresponding memory 23, 24 or 25. By way of example, if the black-nonuniformity data have been recorded in accordance with the procedure of FIG. 6, the memory 11 will be read and the data transferred into the black memory 23. The same procedure will then take place in the case of the memory 24 for local defects and in the case of the memory 25 for defects of nonuniformity of response. In this structure, the microprocessor 18 controls addressing SA of the two memories, writing SE of the memory to be filled, reading SL of the memory 11 and transfer of the data SD from one to the other. This data transfer operation takes place directly in the case of the black and after a computing operation at 18 in the case of nonuniformity of response in order to calculate the coefficient of proportionality 1/B. In the case of the local defects, the microprocessor 18 compares the stored data 11 with limiting values of variation and if they are outside the predetermined range, the zero value is recorded whereas the value b 1 will be recorded if the value is correct, that is to say within the range permitted for the video signal.

FIG. 9 shows the connections of the processing circuits in current use. After corrections, the image memory 11 is filled according to the data stored in the memories 23, 24 and 25. The mode of operation can be understood by referring to the figure. The decision circuit 28 is constituted by an AND-gate with an inverted input. The analog-to-digital conversion circuit 29 is provided at the output with a buffer register RB which makes it possible to assume the previous value in the case of a local defect.

FIG. 10 relates to utilization of the data recorded in the image memory 11 for visual display on a cathode-ray tube (CRT) monitor 13.

FIG. 11 shows the case in which these data are transferred via the coupler 15 to a bus and from said bus to an external utilization unit.

In one example of construction, the streak camera can comprise a tube of the type P 501 and the television camera can be a CCD matrix optical sensor of the type designated as TH 7861 which provides 576 lines each consisting of 384 elementary points. The system thus formed permits accurate scanning of fast signals having a time-duration which can be within the range of 30 picoseconds to a few nanoseconds, for example. For delayed external utilization, the input/output coupler 15 can be of the type IEE 488 which delivers the data on a bus of the same type (IEE 488).

What is claimed is:

1. A system for acquisition and scanning of fast signals, which makes use of a streak camera upstream of a solid-state television camera and is equipped with a device for correcting the detected video signal, said signal being transmitted to a processing circuit comprising means for analog-to-digital conversion and digital-to-analog conversion, for storage in memory, for management and computation, for subtraction and multiplication in order to correct defects of nonuniformity of black, local defects and defects of nonuniformity of response, in which the correction for nonuniformity of black is made by analog subtraction in a subtracting circuit and which also receives the video signal of the television camera and the data relating to correction for nonuniformity of black and stored in a first memory, correction for local defects being made by validation in the case of a correct element of the sensing matrix and by sampling of the signal corresponding to the preceding element if the element is defective, correction for nonuniformity of response being made by computation of a coefficient of proportionality and storage of said data in a second memory and by multiplication of the corresponding corrective term with a corrected video signal of the black, wherein the output of the subtracting circuit is connected to the multiplying circuit through an analog-to-digital converter which receives a signal for validation of local defects stored in a third memory, correction for nonuniformity of response being made in digital form in said multiplying circuit which delivers the corrected video signal via a digital output to an image memory in which it is stored, the means for management and computation being employed in order to produce from the data stored in the image memory data for correction of complementary defects represented by the defects of nonlinearity of response of the complete chain and by geometrical defects of spatial and temporal nonlinearities caused by the elements upstream of the television camera, said complementary data being stored in a fourth and fifth memory respectively.

2. A system according to claim 1 in which the management and computation circuits comprise a processor and a time base, wherein the geometrical nonlinearity data are obtained in a first step by applying uniform illumination to the entrance of the slit which comprises a plurality N of channels and by identifying with the processor, by analysis of the data stored in the image memory, the real positions in X,Y of the corresponding N luminous lines produced on the sensing matrix of the television camera, then in a second step by applying one and the same periodic signal to the N inputs and by employing the processor in order to scan the deformation of said signal along said lines, the positions of which are known, and in a final step by using the processor to compute for each channel a polynomial corresponding to each line and storing said polynomial in the fourth memory with a view to carrying out during subsequent utilization corrections of nonlinearities corresponding to the recording stored in the image memory.

3. A system according to claim 2, wherein the data relating to nonlinearity of response are established by recording in the image memory the responses of the N channels to one and the same given illumination signal and by changing the value of said illumination signal a plurality L of times in order to ensure uniform coverage of the dynamic range of the system and finally to obtain L lines recorded by each channel, the processor being intended to compute the mean value of each line in order to obtain L values for determining the response of the corresponding channel by means of a polynomial, the data of which are stored in the fifth memory.

4. A system according to claim 2, wherein the image memory is employed for writing in a first step in order to record the detected data relating to nonuniformity of black, nonuniformity of response and local defects by application of a video signal through the analog-to-digital converter which is time-controlled by the time-base circuit which also controls addressing and writing in the memory and wherein said image memory is employed for reading in a second step in order to transfer said data into the corresponding memory, the processor being intended to determine the corrective multiplication term in the case of nonuniformity of response and to determine the defective elements in the case of local defects.

5. A system according to claim 2, wherein the third memory is connected to the analog-to-digital converter through an AND-gate circuit which is connected to the processor through another input and wherein the converter is provided at the output with a buffer register for sampling the previous value in the event of a defective element.

6. A system according to claim 2, wherein said system comprises a switch at the output of the multiplier for directly connecting the corrected digital video signal to a device for visual display in real time.

7. A system according to claim 2, wherein the microprocessor is connected to an external utilization unit via an input/output coupler for transmitting data of the image memory after complementary correction of the defects of geometry and nonlinearity.

8. A system according to claim 7, wherein the receiving chain comprises an interface circuit having N light inputs and N light outputs, optical means for closing the N juxtaposed outputs so as to form a slit, the streak camera being intended to receive light from said N juxtaposed outputs, and an optical coupling of the streak camera with a solid-state television camera if necessary through an image intensifier, the television camera being such as to comprise a matrix in the form of a charge-coupled device as well as preamplification and reading circuits.

* * * * *